United States Patent
Nakazato

(10) Patent No.: US 9,013,132 B2
(45) Date of Patent: Apr. 21, 2015

(54) VARIABLE RELUCTANCE RESOLVER AND ROTATION ANGLE DETECTING DEVICE

(75) Inventor: Kenichi Nakazato, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 560 days.

(21) Appl. No.: 13/528,837

(22) Filed: Jun. 21, 2012

(65) Prior Publication Data

US 2013/0060518 A1 Mar. 7, 2013

(30) Foreign Application Priority Data

Sep. 2, 2011 (JP) ................................. 2011-191278

(51) Int. Cl.
| | | |
|---|---|---|
| H02K 11/00 | (2006.01) | |
| H02K 23/66 | (2006.01) | |
| H02K 17/42 | (2006.01) | |
| H02K 19/20 | (2006.01) | |
| H02K 19/24 | (2006.01) | |
| G05B 19/31 | (2006.01) | |
| G01D 5/20 | (2006.01) | |
| H02K 24/00 | (2006.01) | |
| G05B 19/33 | (2006.01) | |
| H02K 19/26 | (2006.01) | |
| H02K 19/38 | (2006.01) | |

(52) U.S. Cl.
CPC .............. *G01D 5/2073* (2013.01); *G05B 19/33* (2013.01); *H02K 19/24* (2013.01); *H02K 24/00* (2013.01); *H02K 19/26* (2013.01); *H02K 19/38* (2013.01)

(58) Field of Classification Search
CPC ....... H02K 24/00; H02K 19/16; H02K 19/26; H02K 19/34; H02K 19/38; G05B 19/33; G05B 19/351; G01D 5/2073; H02P 6/16
USPC .......................... 318/605; 310/68 B, 168–170
See application file for complete search history.

(56) References Cited

U.S. PATENT DOCUMENTS

| | | | | |
|---|---|---|---|---|
| 4,604,575 A | * | 8/1986 | Shimizu et al. | ........... 324/207.18 |
| 5,189,353 A | * | 2/1993 | Ezuka | ............................ 318/605 |
| 5,250,889 A | * | 10/1993 | Ezuka | ............................ 318/661 |
| 7,005,771 B2 | * | 2/2006 | Kobayashi | ..................... 310/168 |

FOREIGN PATENT DOCUMENTS

| | | |
|---|---|---|
| JP | 2000-018968 | 1/2000 |
| JP | 2008-216142 | 9/2008 |

OTHER PUBLICATIONS

NPL-STIC Search Report.*

* cited by examiner

*Primary Examiner* — Shawki S Ismail
*Assistant Examiner* — Bradley Brown
(74) *Attorney, Agent, or Firm* — Greenblum & Bernstein, P.L.C.

(57) ABSTRACT

Two excitation coils (excitation A coil, excitation B coil) and two detection coils (detection A coil, detection B coil) are provided. The excitation A coil and the excitation B coil are excited at frequencies that are different from each other. The number of turns of the detection A coil and the detection B coil are respectively set with two sine waves using the number $m_{s1}$ and $m_{s2}$ of pole pairs. The number $m_{s1}$ and $m_{s2}$ of pole pairs, the number $m_{x1}$ and $m_{x2}$ of pole pairs of the excitation A coil and the excitation B coil, and the number $m_r$ of pole pairs of a rotor are set to have a predetermined relationship. A resolver having redundancy can be realized with small number of coils.

2 Claims, 6 Drawing Sheets

FIG. 3

TABLE 1

| | | NUMBER OF POLE PAIRS | AMPLITUDE k | OUTPUT SIGNAL $V_{s1}$ | OUTPUT SIGNAL $V_{s2}$ |
|---|---|---|---|---|---|
| $\omega_1$ COMPONENT | (C1) | $m_{x1} - m_{s1} - m_r = 0$ | $\dfrac{N_{xmax} \cdot N_{smax} \cdot r_{x1} \cdot r_{s1} \cdot \alpha}{4R_0}$ | $k \cdot \cos(m_r\theta - \theta_{x1} + \theta_{s1}) \cdot \sin(\omega_1 t)$ | $k \cdot \sin(m_r\theta - \theta_{x1} + \theta_{s1}) \cdot \sin(\omega_1 t)$ |
| | (C2) | $m_{x1} - m_{s1} + m_r = 0$ | | $k \cdot \cos(m_r\theta + \theta_{x1} - \theta_{s1}) \cdot \sin(\omega_1 t)$ | $-k \cdot \sin(m_r\theta + \theta_{x1} - \theta_{s1}) \cdot \sin(\omega_1 t)$ |
| | (C3) | $m_{x1} + m_{s1} - m_r = 0$ | | $k \cdot \cos(m_r\theta - \theta_{x1} - \theta_{s1}) \cdot \sin(\omega_1 t)$ | $-k \cdot \sin(m_r\theta - \theta_{x1} - \theta_{s1}) \cdot \sin(\omega_1 t)$ |
| | (C4) | $m_{x1} + m_{s1} + m_r = 0$ | | $k \cdot \cos(m_r\theta + \theta_{x1} + \theta_{s1}) \cdot \sin(\omega_1 t)$ | $k \cdot \sin(m_r\theta + \theta_{x1} + \theta_{s1}) \cdot \sin(\omega_1 t)$ |
| | (C5) | $m_{x1} - m_{s2} - m_r = 0$ | $\dfrac{N_{xmax} \cdot N_{smax} \cdot r_{x1} \cdot r_{s2} \cdot \alpha}{4R_0}$ | $k \cdot \cos(m_r\theta - \theta_{x1} + \theta_{s2}) \cdot \sin(\omega_1 t)$ | $k \cdot \sin(m_r\theta - \theta_{x1} + \theta_{s2}) \cdot \sin(\omega_1 t)$ |
| | (C6) | $m_{x1} - m_{s2} + m_r = 0$ | | $k \cdot \cos(m_r\theta + \theta_{x1} - \theta_{s2}) \cdot \sin(\omega_1 t)$ | $-k \cdot \sin(m_r\theta + \theta_{x1} - \theta_{s2}) \cdot \sin(\omega_1 t)$ |
| | (C7) | $m_{x1} + m_{s2} - m_r = 0$ | | $k \cdot \cos(m_r\theta - \theta_{x1} - \theta_{s2}) \cdot \sin(\omega_1 t)$ | $-k \cdot \sin(m_r\theta - \theta_{x1} - \theta_{s2}) \cdot \sin(\omega_1 t)$ |
| | (C8) | $m_{x1} + m_{s2} + m_r = 0$ | | $k \cdot \cos(m_r\theta + \theta_{x1} + \theta_{s2}) \cdot \sin(\omega_1 t)$ | $k \cdot \sin(m_r\theta + \theta_{x1} + \theta_{s2}) \cdot \sin(\omega_1 t)$ |
| $\omega_2$ COMPONENT | (C11) | $m_{x2} - m_{s1} - m_r = 0$ | $\dfrac{N_{xmax} \cdot N_{smax} \cdot r_{x2} \cdot r_{s1} \cdot \alpha}{4R_0}$ | $k \cdot \cos(m_r\theta - \theta_{x2} + \theta_{s1}) \cdot \sin(\omega_2 t)$ | $k \cdot \sin(m_r\theta - \theta_{x2} + \theta_{s1}) \cdot \sin(\omega_2 t)$ |
| | (C12) | $m_{x2} - m_{s1} + m_r = 0$ | | $k \cdot \cos(m_r\theta + \theta_{x2} - \theta_{s1}) \cdot \sin(\omega_2 t)$ | $-k \cdot \sin(m_r\theta + \theta_{x2} - \theta_{s1}) \cdot \sin(\omega_2 t)$ |
| | (C13) | $m_{x2} + m_{s1} - m_r = 0$ | | $k \cdot \cos(m_r\theta - \theta_{x2} - \theta_{s1}) \cdot \sin(\omega_2 t)$ | $-k \cdot \sin(m_r\theta - \theta_{x2} - \theta_{s1}) \cdot \sin(\omega_2 t)$ |
| | (C14) | $m_{x2} + m_{s1} + m_r = 0$ | | $k \cdot \cos(m_r\theta + \theta_{x2} + \theta_{s1}) \cdot \sin(\omega_2 t)$ | $k \cdot \sin(m_r\theta + \theta_{x2} + \theta_{s1}) \cdot \sin(\omega_2 t)$ |
| | (C15) | $m_{x2} - m_{s2} - m_r = 0$ | $\dfrac{N_{xmax} \cdot N_{smax} \cdot r_{x2} \cdot r_{s2} \cdot \alpha}{4R_0}$ | $k \cdot \cos(m_r\theta - \theta_{x2} + \theta_{s2}) \cdot \sin(\omega_2 t)$ | $k \cdot \sin(m_r\theta - \theta_{x2} + \theta_{s2}) \cdot \sin(\omega_2 t)$ |
| | (C16) | $m_{x2} - m_{s2} + m_r = 0$ | | $k \cdot \cos(m_r\theta + \theta_{x2} - \theta_{s2}) \cdot \sin(\omega_2 t)$ | $-k \cdot \sin(m_r\theta + \theta_{x2} - \theta_{s2}) \cdot \sin(\omega_2 t)$ |
| | (C17) | $m_{x2} + m_{s2} - m_r = 0$ | | $k \cdot \cos(m_r\theta - \theta_{x2} - \theta_{s2}) \cdot \sin(\omega_2 t)$ | $-k \cdot \sin(m_r\theta - \theta_{x2} - \theta_{s2}) \cdot \sin(\omega_2 t)$ |
| | (C18) | $m_{x2} + m_{s2} + m_r = 0$ | | $k \cdot \cos(m_r\theta + \theta_{x2} + \theta_{s2}) \cdot \sin(\omega_2 t)$ | $k \cdot \sin(m_r\theta + \theta_{x2} + \theta_{s2}) \cdot \sin(\omega_2 t)$ |

TABLE 2

| TOOTH No. | $N_{X1i}$ | $N_{X2i}$ | $N_{S1i}$ | $N_{S2i}$ |
|---|---|---|---|---|
| 1 | 30 | 30 | 101 | 0 |
| 2 | -30 | 0 | -37 | 93 |
| 3 | 30 | -30 | -70 | -70 |
| 4 | -30 | 0 | 93 | -37 |
| 5 | 30 | 30 | 0 | 101 |
| 6 | -30 | 0 | -93 | -37 |
| 7 | 30 | -30 | 70 | -70 |
| 8 | -30 | 0 | 37 | 93 |
| 9 | 30 | 30 | -101 | 0 |
| 10 | -30 | 0 | 37 | -93 |
| 11 | 30 | -30 | 70 | 70 |
| 12 | -30 | 0 | -93 | 37 |
| 13 | 30 | 30 | 0 | -101 |
| 14 | -30 | 0 | 93 | 37 |
| 15 | 30 | -30 | -70 | 70 |
| 16 | -30 | 0 | -37 | -93 |

VARIABLE RELUCTANCE RESOLVER AND ROTATION ANGLE DETECTING DEVICE

TECHNICAL FIELD

The present invention relates to a variable reluctance resolver, and in particular, the present invention relates to a variable reluctance resolver which has redundancy and a rotation angle detecting device using the resolver.

BACKGROUND ART

For example, a resolver used in a motor control system of a driving system of an automobile is required to have redundancy. FIG. 1 illustrates the configuration which is disclosed in Japanese Registered Patent No. 4157930 (Japanese Patent Application Laid Open No. 2000-18968) as a prior art example of this type of resolver. In FIG. 1, 11 denotes a stator, 12 denotes a first redundant resolver coil, 13 denotes a second redundant resolver coil, and 14 denotes a rotor.

In this example, first redundant resolver coils 12 and second redundant resolver coils 13 are provided to one stator 11 in a manner to be separated for every 90 degrees. A pair of first redundant resolver coils 12 is disposed on positions opposed to each other by 180 degrees and a pair of second redundant resolver coils 13 is disposed on positions opposed to each other by 180 degrees as well. Thus, the coils of two systems are provided to one stator 11 so as to provide redundancy, in this example.

Meanwhile, FIG. 2 illustrates the configuration of a rotation angle detecting device disclosed in Japanese Patent Application Laid Open No. 2008-216142. This rotation angle detecting device includes a rotation angle detecting unit 20, a signal processing unit 30, and wire harnesses 41 to 46 which are signal lines between the rotation angle detecting unit 20 and the signal processing unit 30.

The rotation angle detecting unit 20 includes two resolvers 21 and 22, and redundancy can be secured by arranging the two resolvers 21 and 22 concentrically on the same axis, for example. The resolvers 21 and 22 are variable reluctance resolvers. The resolver 21 is provided with an excitation coil 23 and detection coils 24 and 25, and the resolver 22 is provided with an excitation coil 26 and detection coils 27 and 28. Thus, the resolvers 21 and 22 are one-phase excitation and two-phase output resolvers. In this example, the detection coil 24 and the detection coil 27 forming a sin phase of the two resolvers 21 and 22 are connected in series and the detection coil 25 and the detection coil 28 forming a cos phase are also connected in series.

The signal processing unit 30 includes AC sources 31 and 32 which are respectively connected to the excitation coils 23 and 26 via the wire harnesses 41 and 46, a detector circuit 33 which detects detection signals of the resolvers 21 and 22 via the wire harnesses 42 to 45, and R/D converters 34 and 35 to which an output signal of the detector circuit 33 is inputted. The AC sources 31 and 32 respectively supply excitation signals of which frequencies are different from each other to the excitation coils 23 and 26.

A detection signal of a first frequency is induced in the detection coils 24 and 25 of the resolver 21, and a detection signal of a second frequency is induced in the detection coils 27 and 28 of the resolver 22. Since the detection coil 24 and the detection coil 27 are connected in series, a first multiplexed signal which is obtained by multiplexing a sin-phase detection signal of the first frequency which is induced in the detection coil 24 and a sin-phase detection signal of the second frequency which is induced in the detection coil 27 is inputted into the detector circuit 33. Further, a second multiplexed signal which is obtained by multiplexing a cos-phase detection signal of the first frequency which is induced in the detection coil 25 and a cos-phase detection signal of the second frequency which is induced in the detection coil 28 is inputted into the detector circuit 33.

The detector circuit 33 separates these inputted first and second multiplexed signals into a detection signal of the first frequency and a detection signal of the second frequency. To the R/D converters 34 and 35, the signals separated by the detector circuit 33 are inputted. The R/D converter 34 calculates a rotation angle $\theta_1$ which is detected by the resolver 21, based on a sin-phase output signal and a cos-phase output signal of the first frequency, and in a similar manner, the R/D converter 35 calculates a rotation angle $\theta_2$ which is detected by the resolver 22, based on a sin-phase output signal and a cos-phase output signal of the second frequency. In a case where the resolvers 21 and 22 are disposed adjacent to each other on the same rotation axis, these rotation angles $\theta_1$ and $\theta_2$ are equal to each other, being able to secure redundancy.

Here, in the resolver illustrated in FIG. 1, the first redundant resolver coil 12 and the second redundant resolver coil 13 are separately provided. Accordingly, when a one-phase excitation and two-phase output resolver is employed, for example, an excitation coil and two detection coils are required for each of the first redundant resolver coil 12 and the second redundant resolver coil 13. Therefore, the number of wirings for the resolvers is 12 in total and thus the wiring is complicated disadvantageously.

On the other hand, in the configuration illustrated in FIG. 2, redundancy can be secured by disposing the two resolvers 21 and 22 on the same rotation axis. Detection signals can be multiplexed by changing frequencies of excitation signals of the two resolvers 21 and 22 and thus increase of the number of wirings (the number of wire harnesses) can be suppressed.

However, the configuration illustrated in FIG. 2 requires two pieces of resolvers 21 and 22. Further, redundancy is secured only when abnormality such as disconnection occurs on an excitation coil of one of the resolvers, but a rotation angle cannot be detected when abnormality such as disconnection occurs on any one of detection coils, deteriorating redundancy.

SUMMARY OF THE INVENTION

An object of the present invention is to provide a variable reluctance resolver and a rotation angle detecting device provided with the resolver. To the variable reluctance resolver, redundancy can be provided by two excitation coils and two detection coils, that is, four coils in total. Accordingly, the number of wirings, which has been required to be 12 in prior art, for example, can be reduced to 8, so that assembling becomes simple and the cost can be reduced.

According to the invention, a variable reluctance resolver includes two excitation coils and two detection coils. In the variable reluctance resolver, the two excitation coils are excited by frequencies that are different from each other, when the number of teeth is set to be n and a tooth number is set to be i, i being 1, 2, ..., n, the number $N_{x1i}$ of turns and the number $N_{x2i}$ of turns of the two excitation coils and the number $N_{s1i}$ of turns and the number $N_{s2i}$ of turns of the two detection coils with respect to each tooth of a stator are expressed as $$N_{x1i} = N_{xmax} \cdot r_{x1} \cdot \cos(m_{x1}\Psi_i + \theta_{x1})$$

$$N_{x2i} = N_{xmax} \cdot r_{x2} \cdot \cos(m_{x2}\Psi_i + \theta_{x2})$$

$$N_{s1i}=N_{smax}\cdot\{r_{s1}\cdot\cos(m_{s1}\Psi_i+\theta_{s1})+r_{s2}\cdot\cos(m_{s2}\Psi_i+\theta_{s2})\}$$

$$N_{s2i}=N_{smax}\{r_{s1}\cdot\sin(m_{s1}\Psi_i+\theta_{s1})+r_{s2}\cdot\sin(m_{s2}\Psi_i+\theta_{s2})\},$$
in which $N_{xmax}$: maximum number of turns of the excitation coils,
$N_{smax}$: maximum number of turns of the detection coils,
$m_{x1}, m_{x2}$: number of pole pairs of the excitation coils,
$m_{s1}, m_{s2}$: number of pole pairs of the detection coils,
$\theta_{x1}, \theta_{x2}$: phase of the excitation coils,
$\theta_{s1}, \theta_{s2}$: phase of the detection coils,
$r_{x1}, r_{x2}$: coefficient of the excitation coils,
$r_{s1}, r_{s2}$: coefficient of the detection coils, and
$\Psi_i$: teeth angle are set, and $M_{x1}$, $m_{x2}$, $m_{s1}$, $m_{s2}$, and the number $m_r$ of pole pairs of a rotor are set to satisfy one condition among a total of eight conditions of $m_{x1} \pm m_{s1} = \pm m_r$ and $m_{x1} \pm m_{s2} = \pm m_r$, and further satisfy one condition among a total of eight conditions of $m_{x2} \pm m_{s1} = \pm m_r$ and $m_{x2} \pm m_{s2} = \pm m_r$.

According to the invention, a rotation angle detecting device includes the variable reluctance resolver described above, first and second excitation circuits configured to respectively supply excitation signals to two excitation coils of the resolver, a first R/D converter configured to synchronously demodulate output signals of two detection coils of the resolver by an excitation signal frequency of the first excitation circuit so as to calculate an angle, a second R/D converter configured to synchronously demodulate output signals of the two detection coils by an excitation signal frequency of the second excitation circuit so as to calculate an angle, a first signal separator configured to separate one of the output signals of the two detection coils into excitation signal frequency components of the first and second excitation circuits, a second signal separator configured to separate the other of the output signals of the two detection coils into the excitation signal frequency components, a third R/D converter configured to calculate an angle by using the components obtained by the separation of the first signal separator, and a fourth R/D converter configured to calculate an angle by using the components obtained by the separation of the second signal separator.

According to the present invention, a resolver having redundancy can be configured by four coils. Accordingly, the number of wirings, which has been required to be 12 in prior art, for example, can be reduced to 8. Therefore, the assembling becomes simple and the winding time of coils can be reduced, being able to reduce the cost.

Further, in a case where a coil is wound in a predetermined angle region as the prior art example illustrated in FIG. 1, when axial deviation of a stator or a rotor occurs in a direction different from a direction in which the coil is wound, an output signal is lowered and angular accuracy is deteriorated. Since a coil is wound over the whole circumference in the present invention, an effect with respect to axial deviation of a stator or a rotor can be reduced and excellent angular accuracy can be obtained.

Further, according to the rotation angle detecting device of the present invention, even when a trouble occurs in any coil of the resolver, a resolver angle can be favorably detected.

BRIEF DESCRIPTION OF THE DRAWINGS

FIG. 3 is a table illustrating a relationship between a setting condition of the number of pole pairs and an obtained output signal.

DETAILED DESCRIPTION OF THE EMBODIMENTS

Figure 1:
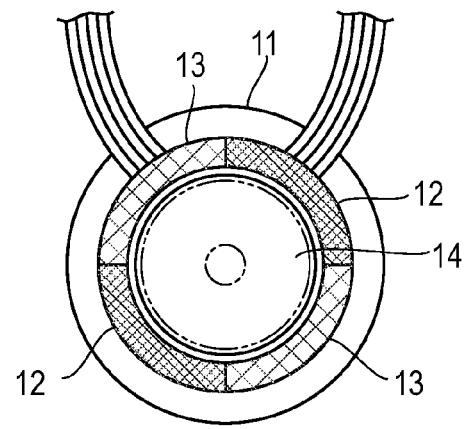
FIG. 1 illustrates a prior art configuration example of a resolver having redundancy.
Figure 2:
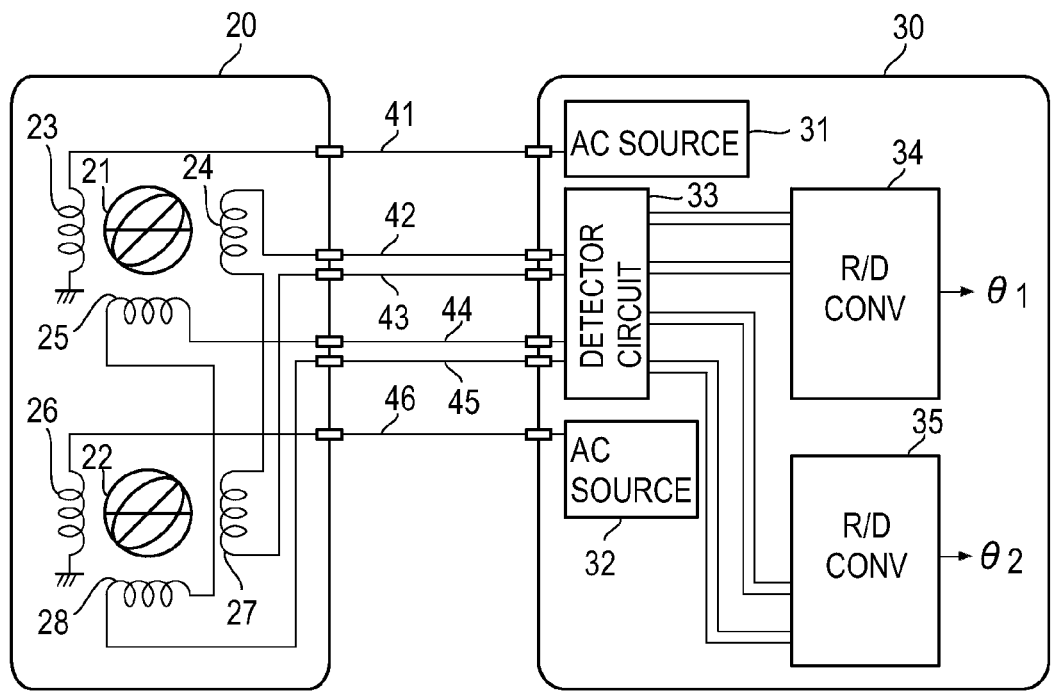
FIG. 2 illustrates a prior art configuration example of a rotation angle detecting device.

The principle of a variable reluctance resolver of prior art is first described.

An excitation coil and a detection coil are wound around each tooth of a stator of a resolver. For example, in a case of one-phase excitation and two-phase output (cos output and sin output) resolver, the number of turns of an excitation coil and the number of turns of each detection coil (cos coil and sin coil) are set as the following.

Number of Turns of Excitation Coil $$N_{x1}=N_{xmax}\cdot\cos(m_x\Psi_i)$$

Number of Turns of Detection Coil $$N_{cos\ i}=N_{smax}\cdot\cos(m_s\Psi_i+\theta_s)\ \ldots\ \text{cos coil}$$

$$N_{sin\ i}=N_{smax}\cdot\sin(m_s\Psi_i+\theta_s)\ \ldots\ \text{sin coil}$$

Here,
i=1, 2, . . . , n (n: number of teeth)
$N_{xmax}$: maximum number of turns of excitation coil,
$N_{smax}$: maximum number of turns of detection coil,
$m_x$: number of pole pairs of excitation coil,
$m_s$: number of pole pairs of detection coil,
$\Psi_i$: teeth angle,
$\theta_s$: phase of detection coil The degree of modulation of a rotor (rotor shape) is expressed as the following.

Rotor modulation degree $S_r=(1/R_0)\cdot\{1+\alpha\cos(m_r(\theta+\Psi_i))\}$

Here,
$R_0$: gap reluctance average value,
$\alpha$: gap changing rate,
$m_r$: number of rotor pole pairs,
$\theta$: rotor rotation angle Here, an excitation signal is represented as $\sin(\omega_1 t)$, output signals $V_{cos\ i}$, $V_{sin\ i}$ of the cos coil and the sin coil of each tooth are expressed as the following.

$$V_{cos\ i}=N_{xi}\cdot N_{cos\ i}\cdot S_r\cdot\sin(\omega_1 t)$$

$$V_{sin\ i}=N_{xi}\cdot N_{sin\ i}\cdot S_r\cdot\sin(\omega_1 t)$$

The output signals $V_{cos}$ and $V_{sin}$ of the resolver are the sum of coil output signals of respective teeth, so that the output signals $V_{cos}$ and $V_{sin}$ are expressed as the following.

$$V_{cos} = \Sigma_i \{N_{xi} \cdot N_{cos\ i} \cdot S_r \cdot \sin(\omega_1 t)\}$$

$$V_{sin} = \Sigma_i \{N_{xi} \cdot N_{sin\ i} \cdot S_r \cdot \sin(\omega_1 t)\}$$

For example, the above formulas are calculated about the cos coil output signal $V_{cos}$, the following formula is obtained.

$$V_{cos} = \Sigma_i [N_{xmax} \cos(m_x \Psi_i) \cdot N_{smax} \cos(m_s \Psi_i + \theta_s) \cdot (1/R_0) \cdot \quad (1)$$
$$\{1 + \alpha \cos(m_r(\theta + \Psi_i))\} \cdot \sin(\omega_1 t)]$$
$$= \Sigma_i [N_{xmax} \cdot N_{smax} \cdot (1/R_0) \cdot \{\cos(m_x \Psi_i) \cdot \cos(m_s \Psi_i + \theta_s) + $$
$$\alpha \cos(m_x \Psi_i) \cdot \cos(m_s \Psi_i + \theta_s) \cdot \cos(m_r(\theta + \Psi_i))\} \cdot \sin(\omega_1 t)]$$
$$= \Sigma_i [(1/2) \cdot N_{xmax} \cdot N_{smax} \cdot (1/R_0) \cdot \{\cos((m_x + m_s)\Psi_i + \theta_s) + $$
$$\cos((m_x - m_s)\Psi_i - \theta_s)\} \cdot $$
$$\sin(\omega_1 t) + (1/2) \cdot N_{xmax} \cdot N_{smax} \cdot (1/R_0) \cdot \alpha \cdot$$
$$\{\cos((m_x - m_s - m_r)\Psi_i - m_r\theta - \theta_s) + $$
$$\cos((m_x + m_s - m_r)\Psi_i - m_r\theta + \theta_s) + $$
$$\cos((m_x - m_s + m_r)\Psi_i + m_r\theta - \theta_s) + $$
$$\cos((m_x + m_s + m_r)\Psi_i + m_r\theta + \theta_s)\} \cdot \sin(\omega_1 t)]$$

$\Psi_i$ is distributed over 360 degrees at regular intervals. Therefore, a cos term including $\Psi_i$ becomes zero in integral by i. Commonly, for the function as a resolver, a preceding term in [ ] in formula (1) becomes zero due to $|m_x| \neq |m_s|$. Accordingly, $V_{cos}$ can be expressed as the following.

$$V_{cos} \propto \Sigma_i \{\cos((m_x - m_s - m_r)\Psi_i - m_r\theta - \theta_s) + \cos((m_x + m_s - m_r)\Psi_i - m_r\theta + \theta_s) + \cos((m_x - m_s + m_r)\Psi_i + m_r\theta - \theta_s) + \cos((m_x + m_s + m_r)\Psi_i + m_r\theta + \theta_s)\} \cdot \sin(\omega_1 t) \quad (2)$$

In a similar manner, $V_{sin}$ can be expressed as the following.

$$V_{sin} \propto \Sigma_i \{-\sin((m_x - m_s - m_r)\Psi_i - m_r\theta - \theta_s) + \sin((m_x + m_s - m_r)\Psi_i - m_r\theta + \theta_s) - \sin((m_x - m_s + m_r)\Psi_i + m_r\theta - \theta_s) + \sin((m_x + m_s + m_r)\Psi_i + m_r\theta + \theta_s)\} \cdot \sin(\omega_1 t) \quad (3)$$

Sin and cos terms including $\Psi_i$ become zero in integral by i. Therefore, when each parameter is set so as to obtain $m_x - m_s - m_r = 0$, only the first term in { } of formulas (2) and (3) is left and formulas (2) and (3) are expressed as the following.

cos coil output signal: $V_{cos} \propto \cos(m_r\theta + \theta_s) \cdot \sin(\omega_1 t)$ sin coil output signal: $V_{sin} \propto \sin(m_r\theta + \theta_s) \cdot \sin(\omega_1 t)$ On the other hand, each parameter is set to obtain $m_x + m_s - m_r = 0$, only the second term in { } is left and formulas (2) and (3) are expressed as the following.

cos coil output signal: $V_{cos} \propto \cos(m_r\theta - \theta_s) \cdot \sin(\omega_1 t)$ sin coil output signal: $V_{sin} \propto -\sin(m_r\theta - \theta_s) \cdot \sin(\omega_1 t)$ Further, when each parameter is set to obtain $m_x - m_s + m_r = 0$, only the third term in { } is left and formulas (2) and (3) are expressed as the following.

cos coil output signal: $V_{cos} \propto \cos(m_r\theta - \theta_s) \cdot \sin(\omega_1 t)$ sin coil output signal: $V_{sin} \propto -\sin(m_r\theta - \theta_s) \cdot \sin(\omega_1 t)$ Further, each parameter is set to obtain $m_x + m_s + m_r = 0$, only the fourth term in { } is left and formulas (2) and (3) are expressed as the following.

cos coil output signal: $V_{cos} \propto \cos(m_r\theta + \theta_s) \cdot \sin(\omega_1 t)$ sin coil output signal: $V_{sin} \propto \sin(m_r\theta + \theta_s) \cdot \sin(\omega_1 t)$ The principle of the variable reluctance resolver of prior art has been described thus far, and thus a resolver angle can be calculated based on a cos coil output signal and a sin coil output signal.

On the other hand, in the present invention, a resolver includes two excitation coils and two detection coils and excitation signals having different frequencies from each other are respectively supplied to the two excitation coils. Since detection signals obtained from the two detection coils have two frequency components, the two frequency components are separated by a signal separator so as to calculate an angle by an R/D converter. Due to such configuration, a normal angle can be calculated even when a trouble occurs in the excitation coils and the detection coils, providing redundancy.

The winding method of the variable reluctance resolver according to the invention is next described. In this invention, redundancy is realized by using two excitation coils and two detection coils, that is, four coils in total. The number of turns of the excitation coil and the number of turns of the detection coil are expressed as the following.

Number of Turns of Excitation Coil $N_{x1i} = N_{xmax} \cdot r_{x1} \cdot \cos(m_{x1}\Psi_i + \theta_{x1})$ ... excitation A coil $N_{x2i} = N_{smax} \cdot r_{x2} \cdot \cos(m_{x2}\Psi_i + \theta_{x2})$ ... excitation B coil Number of Turns of Detection Coil $N_{s1i} = N_{smax} \cdot \{r_{s1} \cdot \cos(m_{s1}\Psi_i + \theta_{s1}) + r_{s2} \cdot \cos(m_{s2}\Psi_i + \theta_{s2})\}$ ... detection A coil $N_{s2i} = N_{smax} \cdot \{r_{s1} \cdot \sin(m_{s1}\Psi_i + \theta_{s1}) + r_{s2} \cdot \sin(m_{s2}\Psi_i + \theta_{s2})\}$ ... detection B coil Here, $m_{x1}$, $m_{x2}$: number of pole pairs of excitation coil,
$m_{s1}$, $m_{s2}$: number of pole pairs of detection coil,
$\theta_{x1}$, $\theta_{x2}$: phase of excitation coil,
$\theta_{s1}$, $\theta_{s2}$: phase of detection coil,
$r_{x1}$, $r_{x2}$: coefficient of excitation coil,
$r_{s1}$, $r_{s2}$: coefficient of detection coil Excitation signals supplied to the excitation A coil and the excitation B coil are respectively represented as $\sin(\omega_1 t)$ and $\sin(\omega_2 t)$. $\omega_1$ and $\omega_2$ are excitation signal frequencies and $\omega_1 \neq \omega_2$ is satisfied. Output signals of the resolver at this time, that is, an output signal $V_{s1}$ of the detection A coil and an output signal $V_{s2}$ of the detection B coil are expressed as the following by calculation similar to the calculation of the resolver in the above-described principle description.

$$V_{s1} \propto \Sigma_i \{\cos((m_{x1} - m_{s1}m_r)\Psi_i - m_r\theta + \theta_{x1} - \theta_{s1}) + \cos((m_{x1} - m_{s1} + m_r)\Psi_i + m_r\theta + \theta_{x1} - \theta_{s1}) + \cos((m_{x1} + m_{s1} - m_r)\Psi_i - m_r\theta + \theta_{x1} + \theta_{s1}) + \cos((m_{x1} + m_{s1} + m_r)\Psi_i + m_r\theta + \theta_{x1} + \theta_{s1}) + \cos((m_{x1} - m_{s2} - m_r)\Psi_i - m_r\theta + \theta_{x1} - \theta_{s2}) + \cos((m_{x1} - m_{s2} + m_r)\Psi_i + m_r\theta + \theta_{x1} - \theta_{s2}) + \cos((m_{x1} + m_{s2} - m_r)\Psi_i - m_r\theta + \theta_{x1} + \theta_{s2}) + \cos((m_{x1} + m_{s2} + m_r)\Psi_i + m_r\theta + \theta_{x1} + \theta_{s2})\} \cdot \sin(\omega_1 t) + \Sigma_i \{\cos((m_{x2} - m_{s1} - m_r)\Psi_i - m_r\theta + \theta_{x2} - \theta_{s1}) + \cos((m_{x2} - m_{s1} + m_r)\Psi_i + m_r\theta + \theta_{x2} - \theta_{s1}) + \cos((m_{x2} + m_{s1} - m_r)\Psi_i - m_r\theta + \theta_{x2} + \theta_{s1}) + \cos((m_{x2} + m_{s1} + m_r)\Psi_i + m_r\theta + \theta_{x2} + \theta_{s1}) + \cos((m_{x2} - m_{s2} - m_r)\Psi_i - m_r\theta + \theta_{x2} - \theta_{s2}) + \cos((m_{x2} - m_{s2} + m_r)\Psi_i + m_r\theta + \theta_{x2} - \theta_{s2}) + \cos((m_{x2} + m_{s2} - m_r)\Psi_i - m_r\theta + \theta_{x2} + \theta_{s2}) + \cos((m_{x2} + m_{s2} + m_r)\Psi_i + m_r\theta + \theta_{x2} + \theta_{s2})\} \cdot \sin(\omega_2 t)$$

$$V_{s2} \propto \Sigma_i \{-\sin((m_{x1} - m_{s1} - m_r)\Psi_i - m_r\theta + \theta_{x1} - \theta_{s1}) - \sin((m_{x1} - m_{s1} + m_r)\Psi_i + m_r\theta + \theta_{x1} - \theta_{s1}) + \sin((m_{x1} + m_{s1} - m_r)\Psi_i - m_r\theta + \theta_{x1} + \theta_{s1}) + \sin((m_{x1} + m_{s1} + m_r)\Psi_i + m_r\theta + \theta_{x1} + \theta_{s1}) - \sin((m_{x1} - m_{s2} - m_r)\Psi_i - m_r\theta + \theta_{x1} - \theta_{s2}) - \sin((m_{x1} - m_{s2} + m_r)\Psi_i + m_r\theta + \theta_{x1} - \theta_{s2}) + \sin((m_{x1} + m_{s2} - m_r)\Psi_i - m_r\theta + \theta_{x1} + \theta_{s2}) + \sin((m_{x1} + m_{s2} + m_r)\Psi_i + m_r\theta + \theta_{x1} + \theta_{s2})\} \cdot \sin(\omega_1 t) + \Sigma_i \{-\sin((m_{x2} - m_{s2} - m_r)\Psi_i - m_r\theta + \theta_{x2} - \theta_{s1}) - \sin((m_{x2} - m_{s1} - m_r)\Psi_i - m_r\theta + \theta_{x2} - \theta_{s1}) + \sin((m_{x2} + m_{s1} - m_r)\Psi_i - m_r\theta + \theta_{x2} + \theta_{s1}) + \sin$$

$\{((m_{x2}+m_{s1}+m_r)\Psi_i+m_r\theta+\theta_{x2}+\theta_{s1})-\sin((m_{x2}-m_{s2}-m_r)\Psi_i-m_r\theta+\theta_{x2}-\theta_{s2})-\sin((m_{x2}-m_{s2}+m_r)\Psi_i+m_r\theta+\theta_{x2}-\theta_{s2})+\sin((m_{x2}+m_{s2}-m_r)\Psi_i-m_r\theta+\theta_{x2}+\theta_{s2})+\sin((m_{x2}+m_{s2}+m_r)\Psi_i+m_r\theta+\theta_{x2}+\theta_{s2})\}\cdot\sin(\omega_2 t)$ Here, when sin and cos terms including $\Psi_i$ become 0 in integral by i. Therefore, when the number of pole pairs $m_{x1}$, $m_{x2}$, $m_{s1}$, $m_{s2}$, and $m_r$ are selected to have a predetermined relationship, the output signal $V_{s1}$ of the detection A coil and the output signal $V_{s2}$ of the detection B coil are expressed as those shown in Table 1 of FIG. 3. In Table 1, the output signals $V_{s1}$ and $V_{s2}$ are shown in a manner to be separated to a $\omega_1$ component and a $\omega_2$ component. Further, as shown in Table 1, as the predetermined relationship of the number of pole pairs, there are eight ways which are (C1) to (C8) in the $\omega_1$ component and eight ways which are (C11) to (C18) in the $\omega_2$ component.

For example, if (C1) $m_{x1}-m_{s1}-M_r=0$ is selected from the $\omega_1$ component and (C15) $m_{x2-ms2}-m_r=0$ is selected from the $\omega_2$ component in Table 1 and each parameter is set so as to satisfy the formulas of (C1) and (C15), the output signal $V_{s1}$ of the detection A coil and the output signal $V_{s2}$ of the detection B coil are expressed as the following.

Detection A Coil Output Signal $V_{s1}=k\cdot\cos(m_r\theta-\theta_{x1}+\theta_{s1})\cdot\sin(\omega_1 t)+k\cdot\cos(m_r\theta-\theta_{x2}+\theta_{s2})\cdot\sin(\omega_2 t)$ Detection B Coil Output Signal $V_{s2}=k\cdot\sin(m_r\theta-\theta_{x1}+\theta_{s1})\cdot\sin(\omega_1 t)+k\cdot\sin(m_r\theta-\theta_{x2}+\theta_{s2})\cdot\sin(\omega_2 t)$ Further, if $\theta_0=-\theta_{x1}+\theta_{s1}$ and $-\theta_{x2}+\theta_{s2}=\theta_0-90°$ are set, the following expressions are obtained.

Detection A Coil Output Signal $V_{s1}=k\cdot\cos(m_r\theta+\theta_0)\cdot\sin(\omega_1 t)+k\cdot\sin(m_r\theta+\theta_0)\cdot\sin(\omega_2 t)$ (4)

Detection B Coil Output Signal $V_{s2}=k\cdot\sin(m_r\theta+\theta_0)\cdot\sin(\omega_1 t)-k\cdot\cos(m_r\theta+\theta_0)\cdot\sin(\omega_2 t)$ (5)

This is output signals of the resolver of the present invention, and a cos component and a sin component are superposed on an output signal of one coil. Here, one condition of the number of pole pairs is selected from (C1) to (C8) of the $\omega_1$ component to be set and one condition is selected from (C11) to (C18) of the $\omega_2$ component to be set, and therefore, there are 8×8=64 ways of combinations.

A rotation angle detecting device employing the above-described resolver which outputs output signals is now be described.

Figure 4:
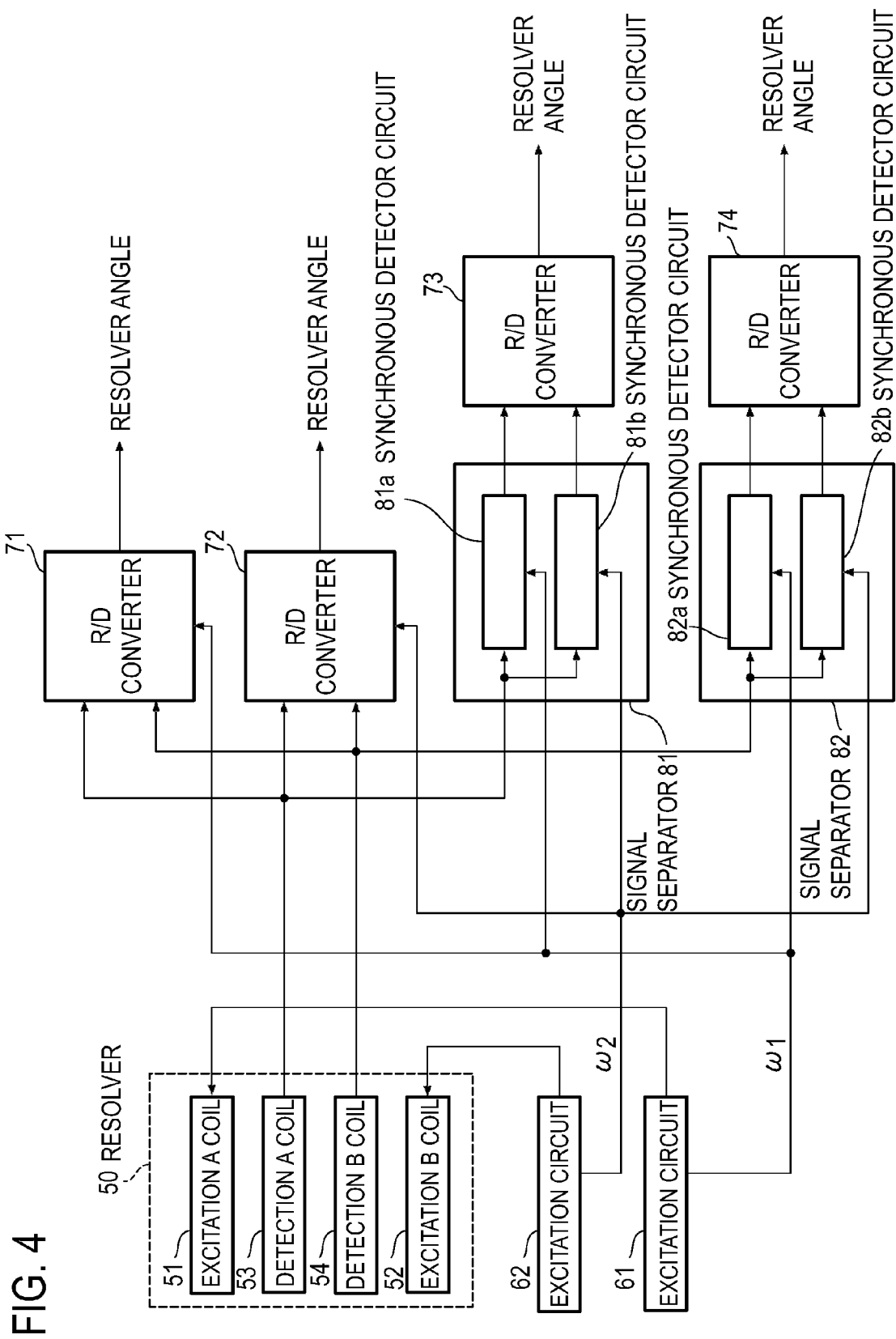
FIG. 4 is a block diagram illustrating the configuration of a rotation angle detecting device according to an embodiment of the present invention.

FIG. 4 illustrates the functional configuration of a rotation angle detecting device according to an embodiment of the present invention. This rotation angle detecting device includes a resolver 50, excitation circuits 61 and 62, R/D converters 71 to 74, and signal separators 81 and 82.

The resolver 50 is not illustrated in detail, and two excitation coils (excitation A coil, excitation B coil) and two detection coils (detection A coil, detection B coil) are merely depicted.

The excitation circuit 61 supplies an excitation signal $\sin(\omega_1 t)$ to an excitation A coil 51 and the excitation circuit 62 supplies an excitation signal $\sin(\omega_2 t)$ to an excitation B coil 52.

Into the R/D converter 71, an output signal of a detection A coil 53 and an output signal of a detection B coil 54 are inputted. The R/D converter 71 performs synchronous demodulation with respect to these output signals by an excitation signal frequency $\omega_1$. When it is assumed that the output signals of the detection A coil 53 and the detection B coil 54 are signals expressed by above-described formulas (4) and (5), the following components can be taken out by synchronous demodulation by the excitation signal frequency $\omega_1$.

Detection A coil: $k\cdot\cos(m_r\theta+\theta_0)$

Detection B coil: $k\cdot\sin(m_r\theta+\theta_0)$

Accordingly, a resolver angle: $m_r\theta+\theta_0$ can be calculated.

Into the R/D converter 72, an output signal of the detection A coil 53 and an output signal of the detection B coil 54 are inputted. The R/D converter 72 performs synchronous demodulation with respect to these output signals by an excitation signal frequency $\omega_2$. By synchronously demodulating the output signals of formulas (4) and (5) by the excitation signal frequency $\omega_2$, the following components can be taken out and a resolver angle: $m_r\theta+\theta_0$ can be calculated.

Detection A coil: $k\cdot\sin(m_r\theta+\theta_0)$

Detection B coil: $-k\cdot\cos(m_r\theta+\theta_0)$

Meanwhile, an output signal of the detection A coil 53 and signals of the excitation signal frequencies $\omega_1$ and $\omega_2$ are inputted into the signal separator 81. The signal separator 81 includes synchronous demodulator circuits 81a and 81b. The synchronous demodulator circuit 81a performs synchronous demodulation with respect to the output signal of the detection A coil 53 by the excitation signal frequency $\omega_1$ and the synchronous demodulator circuit 81b performs synchronous demodulation with respect to the output signal of the detection A coil 53 by the excitation signal frequency $\omega_2$. Accordingly, the following components can be taken out from the output signal of formula (4).

Synchronous demodulation by $\omega_1$: $k\cdot\cos(m_r\theta+\theta_0)$

Synchronous demodulation by $\omega_2$: $k\cdot\sin(m_r\theta+\theta_0)$

These taken out components are inputted into the R/D converter 73, and the R/D converter 73 calculates a resolver angle: $m_r\theta+\theta_0$.

An output signal of the detection B coil 54 and signals of the excitation signal frequencies $\omega_1$ and $\omega_2$ are inputted into the signal separator 82. The signal separator 82 includes synchronous demodulator circuits 82a and 82b. The synchronous demodulator circuit 82a performs synchronous demodulation with respect to the output signal of the detection B coil 54 by the excitation signal frequency $\omega_1$ and the synchronous demodulator circuit 82b performs synchronous demodulation with respect to the output signal of the detection B coil 54 by the excitation signal frequency $\omega_2$. Accordingly, the following components can be taken out from the output signal of formula (5).

Synchronous demodulation by $\omega_1$: $k\cdot\sin(m_r\theta+\theta_0)$

Synchronous demodulation by $\omega_2$: $-k\cdot\cos(m_1\theta+\theta_0)$

These taken out components are inputted into the R/D converter 74, and the R/D converter 74 calculates a resolver angle: $m_r\theta+\theta_0$.

Thus, all of the four R/D converters 71 to 74 can calculate a resolver angle in this example, namely, a resolver angle can be detected by four types of processing. This is because the resolver 50 includes four coils which are the excitation A coil 51, the excitation B coil 52, the detection A coil 53, and the detection B coil 54, and the number of pole pairs of these coils and the number of pole pairs of a rotor are set to be in a predetermined relationship as described above. The resolver 50 substantively has the following four types of combinations.

Excitation A coil, detection A coil, detection B coil
Excitation B coil, detection A coil, detection B coil
Excitation A coil, excitation B coil, detection A coil
Excitation A coil, excitation B coil, detection B coil Accordingly, even if a trouble (occurrence of abnormality such as disconnection) occurs in one coil among four coils, the function of the resolver can be maintained by combinations of the rest of three coils. The detailed description is provided below.

In a case where a trouble occurs in the excitation A coil
   An angle is calculated based on the $\omega_2$ component of the output signal of the detection A coil and the $\omega_2$ component of the output signal of the detection B coil.

In a case where a trouble occurs in the excitation B coil
   An angle is calculated based on the $\omega_1$ component of the output signal of the detection A coil and the $\omega_1$ component of the output signal of the detection B coil.

In a case where a trouble occurs in the detection A coil
   An angle is calculated based on the $\omega_1$ component and the $\omega_2$ component of the output signal of the detection B coil.

In a case where a trouble occurs in the detection B coil
   An angle is calculated based on the $\omega_1$ component and the $\omega_2$ component of the output signal of the detection A coil.

This is described with specific numerical examples below.

For example, in order to configure a resolver having a 12-teeth stator and a pole pair of 2, winding is applied in the following conditions.

$$m_{x1}=6, m_{x2}=3, m_{s1}=4, m_{s2}=1, m_r=2$$

Figure 5:
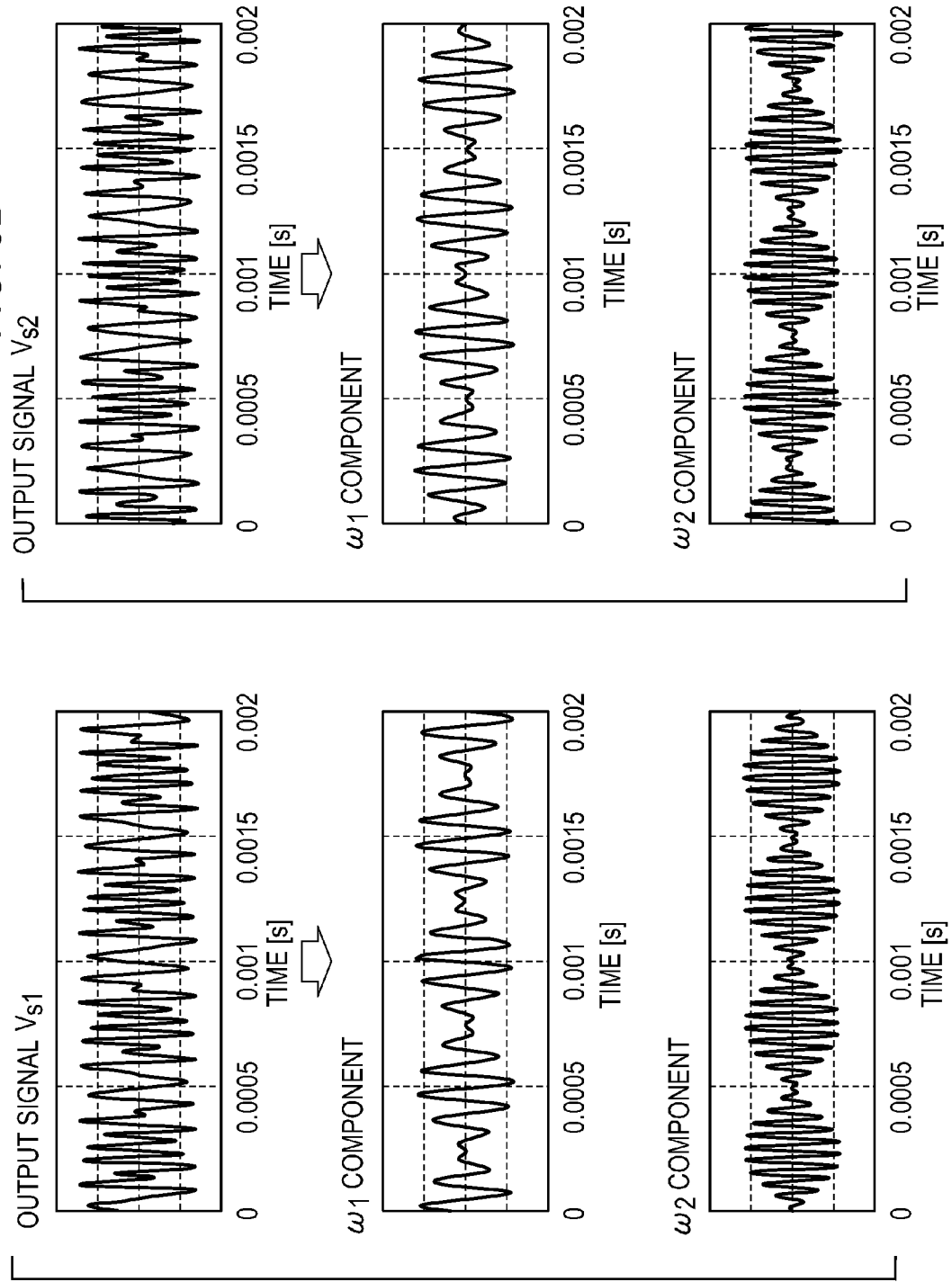
FIG. 5A is a graph illustrating an example of an output signal of a detection A coil and excitation frequency ($\omega_1$, $\omega_2$) components.
FIG. 5B is a graph illustrating an example of an output signal of a detection B coil and excitation frequency ($\omega_1$, $\omega_2$) components.

When the rotation number of the resolver is set to be 30,000 rpm and the excitation signal frequencies are set as $\omega_1=10$ kHz and $\omega_2=20$ kHz, the detection A coil output signal $V_{s1}$ and the detection B coil output signal $V_{s2}$ become as shown in upper stages of FIGS. 5A and 5B. Middle stages and lower stages of FIGS. 5A and 5B respectively illustrate excitation frequency ($\omega_1$, $\omega_2$) components of the output signals $V_{s1}$ and $V_{s2}$.

Figures 6, 7:
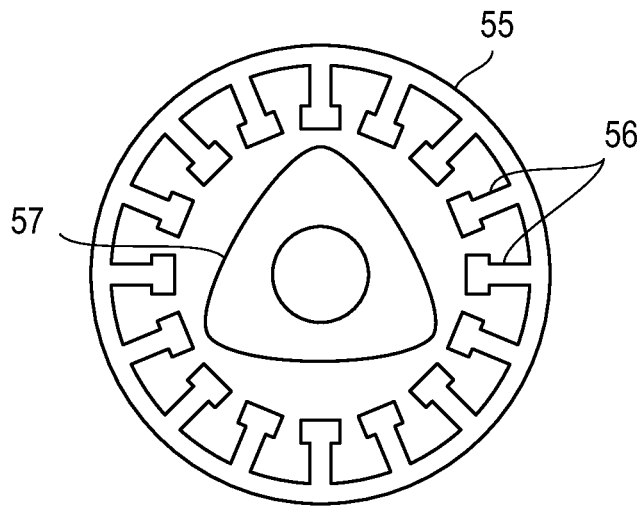
FIG. 6 schematically illustrates the configuration of a resolver.
FIG. 7 is a table illustrating an example of the number of turns of an excitation A coil, an excitation B coil, the detection A coil, and the detection B coil with respect to each tooth.

FIG. 6 is a schematic diagram of a resolver having 16 teeth and a pole pair of 3. In FIG. 6, 55 denotes a stator, 56 denotes teeth, and 57 denotes a rotor. Here, coils are not depicted.

When the resolver having 16-teeth stator and the pole pair of 3 is configured, the winding is applied in the following conditions.

$$m_{x1}=8, m_{x2}=4, m_{s1}=5, m_{s2}=1, m_r=3$$

Further, $$N_{xmax}=30, N_{smax}=100, r_{x1}=r_{x2}=1, r_{s1}=r_{s2}=1$$

are set.

In the above-mentioned conditions, the number $N_{x1i}$ of turns of the excitation A coil, the number $N_{x2i}$ of turns of the excitation B coil, the number $N_{s1i}$ of turns of the detection A coil, and the number $N_{s2i}$ of turns of the detection B coil of each tooth become as shown in Table 2 of FIG. 7. Here, the positive number of turns and the negative number of turns indicate winding directions. The positive number represents a clockwise direction and the negative number represents a counterclockwise direction.

Figure 8:
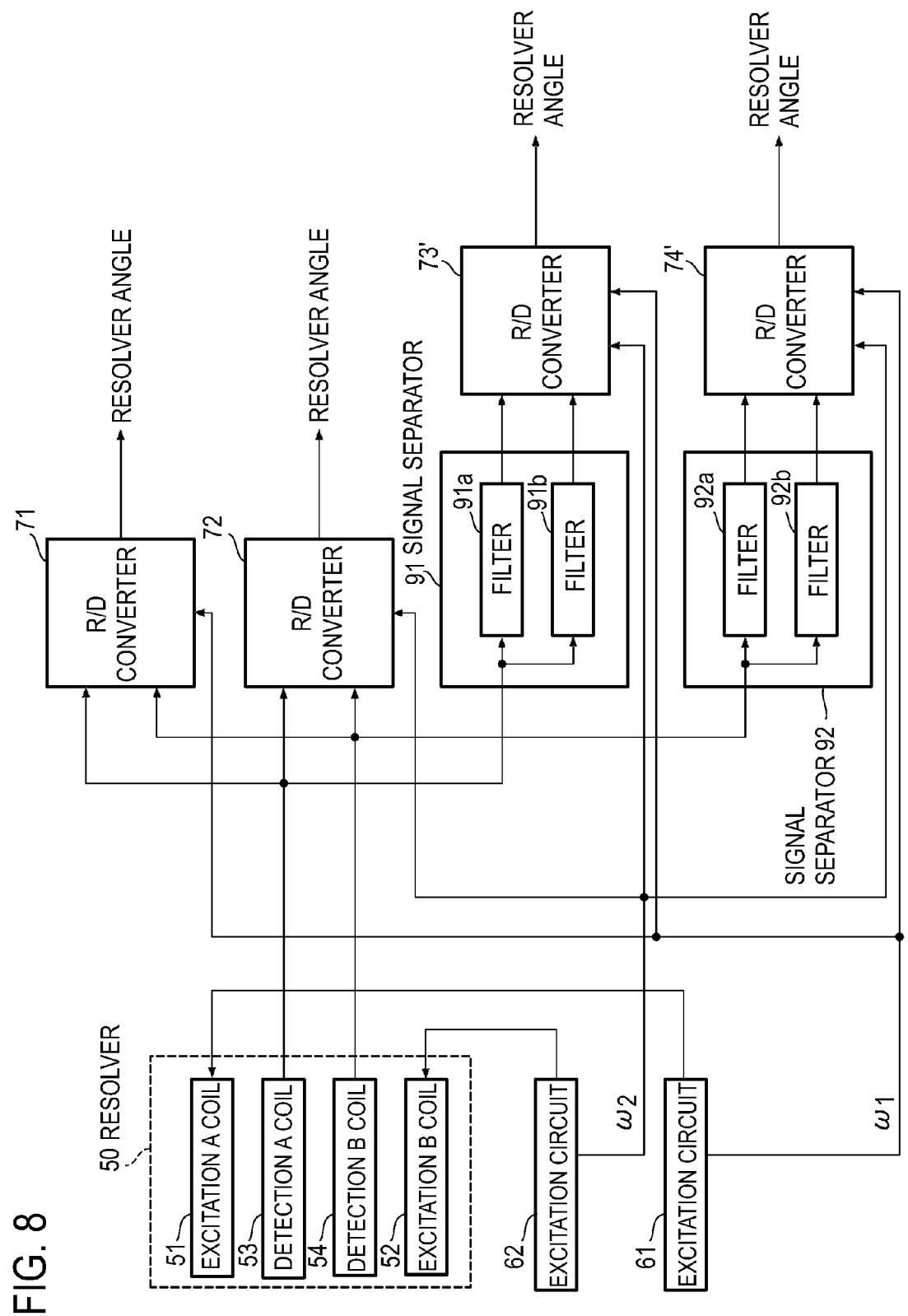
FIG. 8 is a block diagram illustrating the configuration of a rotation angle detecting device according to another embodiment of the present invention.

The resolver and the rotation angle detecting device according to the invention have been described thus far, but the rotation angle detecting device may have the configuration illustrated in FIG. 8. In the rotation angle detecting device illustrated in FIG. 4, the output signals of the detection A coil 53 and the detection B coil 54 are separated into the $\omega_1$ and $\omega_2$ components respectively by synchronous demodulation of the signal separators 81 and 82 which separate output signals into excitation signal frequency components. However, the output signals are separated into the $\omega_1$ and $\omega_2$ components by filters in the rotation angle detecting device illustrated in FIG. 8. In FIG. 8, a signal separator 91 includes filters 91a and 91b and a signal separator 92 includes filters 92a and 92b. Here, excitation frequency components are left in this case, so that synchronous demodulation is required in R/D converters 73' and 74' on the subsequent stage.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A variable reluctance resolver, comprising:
two excitation coils; and
two detection coils; wherein
the two excitation coils are excited by frequencies that are different from each other,
when the number of teeth is set to be n and a tooth number is set to be i, i being 1, 2, . . . , n, the number $N_{x1i}$ of turns and the number $N_{x2i}$ of turns of the two excitation coils and the number $N_{s1i}$ of turns and the number $N_{s2i}$ of turns of the two detection coils with respect to each tooth of a stator are expressed as $$N_{x1i}=N_{xmax} \cdot r_{x1} \cdot \cos(m_{x1}\Psi_i+\theta_{x1})$$

$$N_{x2i}=N_{xmax} \cdot r_{x2} \cdot \cos(m_{x2}\Psi_i+\theta_{x2})$$

$$N_{s1i}=N_{smax} \cdot \{r_{s1} \cdot \cos(m_{s1}\Psi_i+\theta_{s1})+r_{s2} \cdot \cos(m_{s2}\Psi_i+\theta_{s2})\}$$

$$N_{s2i}=N_{smax} \cdot \{r_{s1} \cdot \sin(m_{s1}\Psi_i+\theta_{s1})+r_{s2} \cdot \sin(m_{s2}\Psi_i+\theta_{s2})\},$$
in which, $N_{xmax}$: maximum number of turns of the excitation coils,
$N_{smax}$: maximum number of turns of the detection coils,
$m_{x1}$, $m_{x2}$: number of pole pairs of the excitation coils,
$m_{s1}$, $m_{s2}$: number of pole pairs of the detection coils,
$\theta_{x1}$, $\theta_{x2}$: phase of the excitation coils,
$\theta_{s1}$, $\theta_{s2}$: phase of the detection coils,
$r_{x1}$, $r_{x2}$: coefficient of the excitation coils,
$r_{s1}$, $r_{s2}$: coefficient of the detection coils, and
$\Psi_i$: teeth angle
are set, and
$m_{x1}$, $m_{x2}$, $m_{s1}$, $m_{s2}$, and the number $m_r$ of pole pairs of a rotor are set to satisfy one condition among a total of eight conditions of $m_{x1} \pm m_{s1}=\pm m_r$ and $m_{x1} \pm m_{s2}=\pm m_r$, and further satisfy one condition among a total of eight conditions of $m_{x2} \pm m_{s1}=\pm m_r$ and $m_{x2} \pm m_{s2}=\pm m_r$.

2. A rotation angle detecting device, comprising:
the variable reluctance resolver according to claim 1;
first and second excitation circuits configured to respectively supply excitation signals to two excitation coils of the resolver;
a first R/D converter configured to synchronously demodulate output signals of two detection coils of the resolver by an excitation signal frequency of the first excitation circuit so as to calculate an angle;

a second R/D converter configured to synchronously demodulate output signals of the two detection coils by an excitation signal frequency of the second excitation circuit so as to calculate an angle;

a first signal separator configured to separate one of the output signals of the two detection coils into excitation signal frequency components of the first and second excitation circuits;

a second signal separator configured to separate the other of the output signals of the two detection coils into the excitation signal frequency components;

a third R/D converter configured to calculate an angle by using the components obtained by the separation of the first signal separator; and a fourth R/D converter configured to calculate an angle by using the components obtained by the separation of the second signal separator.

\* \* \* \* \*

UNITED STATES PATENT AND TRADEMARK OFFICE
CERTIFICATE OF CORRECTION

PATENT NO. : 9,013,132 B2  
APPLICATION NO. : 13/528837  
DATED : April 21, 2015  
INVENTOR(S) : Kenichi Nakazato Page 1 of 1

It is certified that error appears in the above-identified patent and that said Letters Patent is hereby corrected as shown below:

In the Specification

Column 4, line 34, of the printed patent, "$N_{xl} = N_{xmax} \cdot \cos(m_x \Psi_i)$" should read
-- $N_{xi} = N_{xmax} \cdot \cos(m_x \Psi_i)$ --.

Column 6, line 25, of the printed patent, "$N_{x2i} = N_{smax} \cdot r_{x2} \cdot \cos(m_{x2} \Psi_i + \theta_{x2})$" should read
-- $N_{x2i} = N_{xmax} \cdot r_{x2} \cdot \cos(m_{x2} \Psi_i + \theta_{x2})$ --.

Column 6, line 48, of the printed patent, "$V_{s1} \propto \Sigma_i \{\cos((m_{x1} - m_{s1}m_r)\Psi_i - m_r\theta + \theta_{x1} - \theta_{s1})$" should read
-- $V_{s1} \propto \Sigma_i \{\cos((m_{x1} - m_{s1} - m_r)\Psi_i - m_r\theta + \theta_{x1} - \theta_{s1})$ --.

Column 6, line 56, of the printed patent, "$\cos((m_{x2} + m_{s1} + m_r)\Psi_i + m_r\theta + \theta_{x2} + {}_{s1})$" should read
-- $\cos((m_{x2} + m_{s1} + m_r)\Psi_i + m_r\theta + \theta_{x2} + \theta_{s1})$ --.

Column 7, line 14, of the printed patent, "$\omega_l$" should read -- $\omega_1$ --.

Column 7, line 17, of the printed patent, "$m_{x1} - m_{s1} - M_r = 0$" should read -- $m_{x1} - m_{s1} - m_r = 0$ --.

Column 7, line 18, of the printed patent, "$m_{x2} - {}_{ms2} - m_r = 0$" should read -- $m_{x2} - m_{s2} - m_r = 0$ --.

Column 8, line 54, of the printed patent, "$\omega_2: -k \cdot \cos(m_1\theta + \theta_0)$" should read
-- $\omega_2: -k \cdot \cos(m_r\theta + \theta_0)$ --.

Column 10, line 9, of the printed patent, "RID converters" should read -- R/D converters --.

Signed and Sealed this  
Third Day of November, 2015

Michelle K. Lee  
*Director of the United States Patent and Trademark Office*